Patented Feb. 26, 1952

2,587,497

UNITED STATES PATENT OFFICE 2,587,497

VINYL TALL OIL ESTER COATING COMPOSITIONS

Paul E. Marling, Dayton, Ohio, assignor to Monsanto Chemical Company, St. Louis, Mo., a corporation of Delaware No Drawing. Application July 29, 1948, Serial No. 41,416

8 Claims. (Cl. 260—23)

This invention relates to new and valuable compositions for preparing protective surfaces. The invention further relates to methods of utilizing a mixture of vinyl esters of tall oil acids as the drying oil in paints and varnishes.

The vinyl esters of tall oil are well known in the paint and varnish art but their use as substitutes for natural drying oils does not generally produce satisfactory results. Tacky or incompletely dried surfaces are common and fully dried surfaces require disportionately long periods of time for drying or curing.

The primary purpose of this invention is to provide new compositions having application in the coating and other fields. A further purpose of the invention is to provide a means of utilizing the vinyl esters of tall oil in place of natural drying oils.

It has now been discovered that coating compositions of especial value are prepared by mixing the vinyl esters of tall oil with anthraquinone. Although practicable results are obtained by the use of 0.01 to 5 percent of the anthraquinone (based on the weight of the vinyl tall oil esters) the preferred practice involves the use of 0.05 to 2 percent of the anthraquinone.

In copending application, Serial No. 41,415, filed July 29, 1948, by Paul E. Marling, there are described and claimed coating compositions involving vinyl tall oil esters and 0.1 to 20 percent by weight of polyunsaturated aromatic unsaturated hydrocarbons, such as divinylbenzene, divinylnaphthalene, divinylbiphenyl, trivinylbenzene and other compounds containing aromatic nucleus and a plurality of polymerizable aliphatic unsaturated hydrocarbon substituents containing proportions of these unsaturated cross-linking agents. These cross-linking agents may be used to supplement the anthraquinone in the practice of this invention. If the cross-linking agent contains two unsaturated radicals, particularly the vinyl and isopropenyl radicals, the preferred practice utilizes from 0.5 to 10 percent of the cross-linking agent. When the cross-linking agent contains three polymerizable unsaturated groups optimum results are obtained by using from 0.2 to 5 percent by weight of the trifunctional substances, for example trivinylbenzene and triisopropenylbenzene.

The new coating compositions are prepared in liquid form by conventional paint compounding methods. The vinyl esters of tall oil, the anthraquinone, and if desired one of the polyunsaturated cross-linking agents are mixed with other suitable modifying agents, for example drying oil, resin, pigment, thinner and drier by any mechanical mixing device and applied by conventional methods, spraying, brushing or dipping.

Although the vinyl esters of tall oil and the anthraquinone are sufficient to permit adequate drying of the liquid coating, it may under some circumstances be desirable to add other oils, for example the drying oils, such as linseed oil and coconut oil which serve to plasticize the final coating. Any proportion of these added oils may be used, but preferably do not exceed the weight of the vinyl tall oil esters.

As is customary in the paint and varnish industry, the new coating compositions may contain large proportions of suitable synthetic or natural resins which serve to produce a hard protective surface. Suitable resins are the various alkyd resins, phenolformaldehyde resins, rosin and rosin esters, polymerized olefins, for example styrene copolymers, copal and other resins used in conventional coating composition preparation.

The coating compositions may further be modified by the incorporation of polymerizable compounds, such as styrene, vinyl esters, maleic anhydride, and other olefinic compounds with suitable peroxide catalysts to induce the polymerization during the drying of the coated film.

If desired the coating composition may contain a pigment or filler, such as titanium dioxide, iron oxide, white lead, carbon black, lead chromate, lithopone or other animal or mineral substances which is known to modify the color of the coating composition or improve its covering power.

Further modification of the coating composition may be effected by the addition of thinners, such as turpentine and petroleum spirits.

The new coating compounds may be either air dried or dried by heating to a suitable elevated temperature, for example 200 to 600° F. If the films are to be air dried it is usually necessary or desirable to introduce suitable metallic salts, particularly the lead, cobalt, manganese salts of the higher molecular weight organic acids, such as naphthenic acid, rosin acid, linoleic acid and octoic acid. Other conventional drying agents may be added in the proportions customary in the coating composition art.

A preferred method of practicing the invention involves the partial polymerization of the vinyl tall oil esters prior to the preparation of the coating composition. The tall oil esters are mixed with anthraquinone and then heated to a temperature and period of time which will induce a partial polymerization. Temperatures of 400° F. to 600° F. and time from 5 to 60 minutes are effective, but care should be taken to avoid polymerization to insoluble resinous compositions. The viscous liquid and soft solid polymers are soluble in petroleum spirits, and from those solutions, clear films or coatings may be prepared which will dry to form excellent coating compositions.

The new compositions may be used to coat impervious surfaces of wood, metal, ceramic, or synthetic resinous materials, or may be used to impregnate or coat materials, such as wood, felt, woven textiles or other porous compositions. Other uses as binding materials for pelleted compositions and adhesives have been successful. Furthermore, the new compositions can be used in the manufacture of linoleum and molding powders.

Further details of the practice of this invention are set forth with respect to the following specific examples.

Example 1

A 50 gram portion of the vinyl esters of tall oil acids was mixed with one gram of anthraquinone and heated at 580° F. for three hours, in a flask provided with a rotary stirring device and an inert atmosphere maintained by means of a continuous stream of carbon dioxide passing through the vessel. Another sample of the vinyl esters of tall oil, not containing the anthraquinone, was treated in identical manner and used as a control. The viscous compositions so obtained were dissolved in petroleum spirits and used to coat tin plated panels for testing purposes. The coated panels were cured by heating at 300° F. After two hours of curing the test samples containing the anthraquinone were a smooth dry surface, whereas the sample not containing anthraquinone was still tacky.

Other test panels and control panels were coated and subjected to air drying tests. The same compositions were modified by adding lead, cobalt, and manganese naphthenate driers (0.4 percent lead, 0.06 percent manganese and 0.06 percent cobalt as metals based on solids content). In all instances compositions containing anthraquinone dried faster than compositions not including it.

Example 2

Using the procedure described in the preceding example, 50 grams of vinyl esters of tall oil and one-half gram of anthraquinone were heated at 500° F. for 45 minutes. Panels coated with this composition were cured by heating at 300° F. for one hour and in all cases smooth, dry surfaces were obtained. Other panels coated with vinyl esters of tall oil not containing anthraquinone, but otherwise processed in the identical manner were not completely set in one hour and were soft, sticky compositions.

The same compositions, both with and without anthraquinone, were further modified by incorporating lead, cobalt and manganese naphthenate driers (0.4 percent lead, 0.06 percent manganese, 0.06 percent cobalt as metals based on the solid content of the coating composition). Four hours air drying set to a smooth surface, whereas the unmodified composition was not completely set in the same period.

The test panels after one hour cure at 300° F. and after air drying for 48 hours were immersed in water for 24 hours. The coating compositions including anthraquinone were unchanged, whereas, the composition not including anthraquinone became white.

Example 3

A sample of vinyl tall oil ester was mixed with 10 percent by weight of a 40 percent concentrate of divinylbenzene and heated at 500° F. for 30 minutes with vigorous agitation, in an atmosphere of carbon dioxide. One-half percent of anthraquinone (based on the weight of vinyl esters) was added and the stirring continued for ten minutes more at 500° F. The viscous composition so obtained was dissolved in petroleum spirit and used to coat tin plated panels for test purposes. A sample of vinyl esters of tall oil not including either the divinylbenzene or the anthraquinone was used as a control. In all cases the modified coating composition dried very much faster than the untreated vinyl esters of tall oil.

Air dry tests were made by further modifying both the modified vinyl esters of tall oil and the control sample by the incorporation of lead, manganese and cobalt naphthenate driers (0.4 percent lead, 0.06 percent manganese and 0.06 percent cobalt as metals based on the solids content of the coating composition). After 24 hours of drying the anthraquinone modified film was smooth and dry to the touch, whereby the control sample was tacky. Immersion in water and two percent sodium hydroxide solution produced no change on the modified composition, whereas the control samples were visibly affected.

The invention is defined by the following claims:

I claim:

1. A coating composition which consists essentially of a substance made by heating in an inert atmosphere at a temperature of 400 to 600° F. vinyl tall oil esters and from 0.01 to 5 percent by weight of anthraquinone, and a solvent for said substance, said percentages being based on the weight of the ester.

2. A method of preparing a coated surface which comprises covering a surface with a solution of a substance made by heating in an inert atmosphere at 400° F. to 600° F. a mixture of vinyl tall oil esters and from 0.01 to 5 percent by weight of anthraquinone, and drying the surface, said percentages being based on the weight of the ester.

3. A coating composition which consists essentially of a substance made by heating in an inert atmosphere at a temperature of 400° F. to 600° F. vinyl tall oil esters and from 0.5 to 2 per cent by weight, based on the esters, of anthraquinone and a solvent for said substance.

4. A method of preparing a coated surface which comprises covering a surface with a solution of a substance made by heating in an inert atmosphere at 400° F. to 600° F. a mixture of vinyl tall oil esters and from 0.01 to 5 per cent by weight, based on the esters, of anthraquinone and drying the surface.

5. A method of preparing a coated surface which comprises covering a surface with a solution of a substance made by heating in an inert atmosphere at 400° F. to 600° F. a mixture of vinyl tall oil esters and from 0.01 to 5 per cent by weight, based on the esters, of anthraquinone and drying the surface by application of heat.

6. A method of preparing a coated surface which comprises covering a surface with a solution of a substance made by heating in an inert atmosphere at a temperature of 400° F. to 600° F. a mixture of vinyl tall oil esters and from 0.01 to 5 per cent by weight, based on the esters, of anthraquinone, and a metal salt drier, and drying the surface by exposure to air.

7. A method of preparing a coated surface which comprises covering a surface with a solution of a substance made by heating in an inert atmosphere at a temperature of 400° F. to 600° F. a mixture of vinyl tall oil esters and from 0.5 to 2 per cent by weight, based on the esters, of anthraquinone and drying the surface by application of heat.

8. A method of preparing a coated surface which comprises covering a surface with a solution of a substance made by heating in an inert atmosphere at a temperature of 400° F. to 600° F. a mixture of vinyl tall oil esters and from 0.5 to 2 per cent by weight, based on the esters, of anthraquinone, and a metal salt drier, and drying the surface by exposure to air.

PAUL E. MARLING.

REFERENCES CITED

The following references are of record in the file of this patent:

UNITED STATES PATENTS

| Number | Name | Date |
| --- | --- | --- |
| 2,054,019 | Jordan et al. | Sept. 8, 1936 |
| 2,213,935 | Sorenson et al. | Sept. 3, 1940 |
| 2,228,365 | Reppe et al. | Jan. 14, 1941 |
| 2,340,110 | D'Alelio | Jan. 25, 1944 |
| 2,468,798 | Young et al. | May 3, 1949 |